Nov. 26, 1968    H. E. THOMASON    3,412,728
SOLAR HEATING EQUIPMENT
Filed Oct. 22, 1965
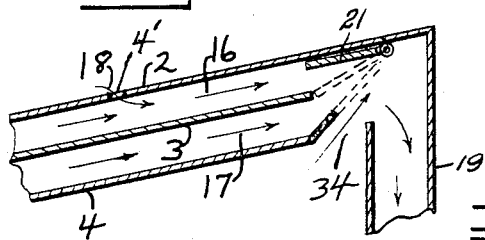
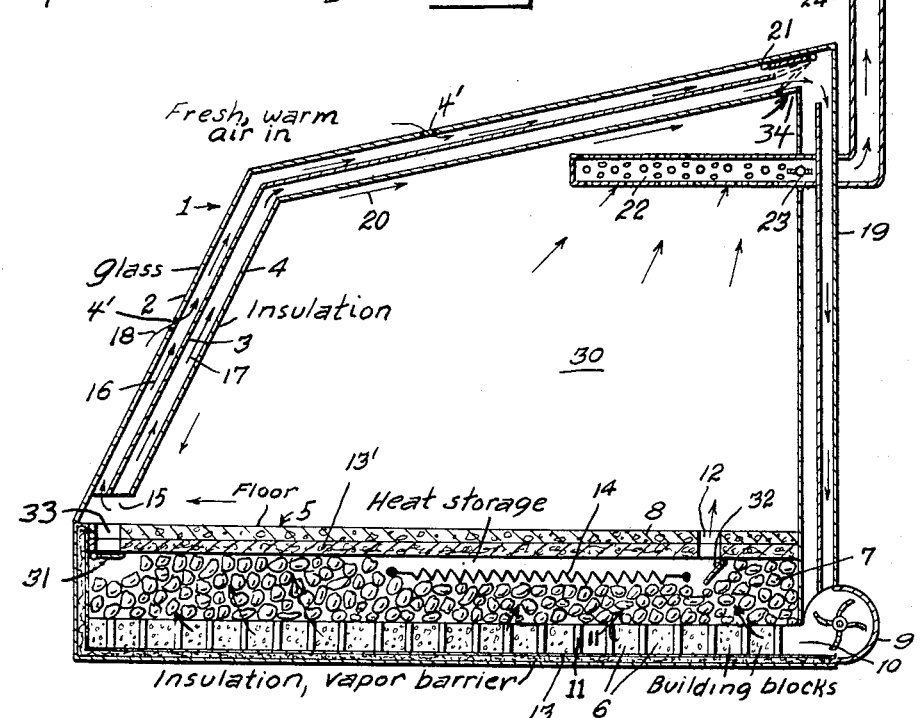
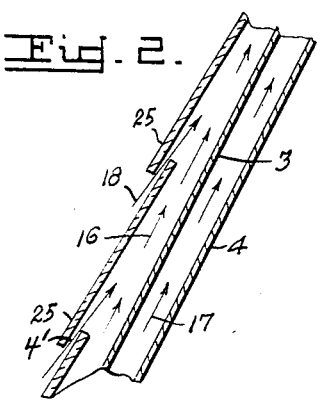
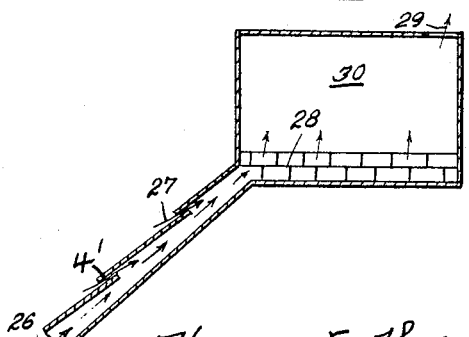
INVENTOR
Harry E. Thomason

United States Patent Office 3,412,728
Patented Nov. 26, 1968

3,412,728
SOLAR HEATING EQUIPMENT
Harry E. Thomason, District Heights, Md.
(6802 Walker Mill Road SE., Washington, D.C. 20027)
Filed Oct. 22, 1965, Ser. No. 501,967
20 Claims. (Cl. 126—270)

ABSTRACT OF THE DISCLOSURE

Solar heat collector 1 on a building warms air and the warmed air is circulated by blower 9 to warm heat storage material 7 and the building space 30. Stale air goes out at 22 and fresh, prewarmed air, enters the system at 4'.

---

This invention relates to equipment to collect and utilize solar heat, in a building, for example.

The building to be warmed, and in which the air is to be conditioned, may be a home or animal shelter, a lumber or crop drying kiln, a greenhouse, or other. In a home, for example, water vapor continuously passes into the air from cooking, bathing, floor mopping, the bodies of occupants and so on. Carbon dioxide is released into the air by the breathing occupants. In a lumber or crop drying kiln water vapor is continuously entering the air from the material being dried. The humidity in greenhouses is sometimes excessive and damaging to the plants being grown. In each case the air tends to become stale, polluted, excessively humid and so on and should be changed.

The present invention provides for automatic introduction of fresh warm air into the system and expulsion of stale spent air which is no longer desirable. Also, solar heat collection and heat storage equipment are simplified, thereby lowering construction and operating costs. Efficiency of heat collection, storage and retrieval from storage are also increased.

In the drawing:

FIG. 1 is a diagrammatic cross-section through the apparatus;

FIG. 1A is an enlarged detail of a damper control of FIG. 1;

FIG. 2 is an enlarged detail of a section of a solar heat collector of preferred construction;

FIG. 3 is a diagrammatic representation of a modification of the apparatus.

Detailed description:

Referring to the drawings in greater detail solar heat collector 1 has an outer transparent covering 2 and a heat collecting sheet 3, preferably treated on its outer surface to absorb sunrays and convert them to infrared heat. This sheet may be corrugated metal, for example. An inner member 4 may be ordinary insulation material, such as glass fiber or foam, or may be reflective insulation such as reflective foil, reflective corrugated aluminum, or other. The transparent covering 2 is preferably provided with passage means 4' to admit warm air from outside to the inside of the collector as illustrated at 18. The passage means may be provided as holes, slits, cracks, overlapping glass panes without airtight seals, jet-venturi devices or other.

Heat storage apparatus 5, otherwise known as a heat bin, preferably comprises a layer of heat storage masonry such as building blocks 6 with passageways therethrough and with non-liquid heat storage material 7 and a floor 8 thereabove. Floor 8 may comprise a heat storage material such as concentrate, for example. If desired, a layer of insulation 13' (e.g. foam insulation) may be provided between material 7 and floor 8 to reduce heat transfer therebetween. Blower 9 preferably draws warm air from the top of the structure through duct 19 and introduces it to blocks 6 through distributor manifold 10, such air passing out into material 7 through cracks 11 between the blocks. The air may pass out of the storage material through one or more holes or registers 12. Insulation 13 is preferably provided for the walls and floor of the heat storage bin.

If desired an auxiliary heat source 14 may be provided and dampers 31, 32 may be provided to close or open passageways 33, 12 respectively.

Air passing through passageway 12 into area 30 may leave through passageway 15 back to heat collector 1, or may leave by passageway 34 for recirculation by blower 9, or may leave the building by passageway 22, 24, or may leave area 30 by two or more of these passageways depending on adjustment of the various dampers 21, 23, 31, 32, as will be explained more fully hereinafter.

Convection currents of warm air are illustrated at 16, 17, 18, 20.

Operation:

The air just above or outside of the transparent solar heat collector cover 2 is generally warmer than ambient air which is not close to the cover due to several factors as follows: (1) the transparency itself is warmed because it intercepts approximately 10–30% of the sunrays passing through the transparency; (2) the warmed air inside of the collector warms the transparency and the air just outside; (3) infrared heat is radiated from the hot solar heat collector sheet 3 to the transparency thereby heating the transparency and the air just outside; (4) if the transparency seal is not perfect, warm air leas out of the collector, thereby warming the air just outside.

In the present invention leakage of warm air out of the collector is prevented or reduced and use is made of the heat above the collector glazing 2 as follows. The air inside of the collector is warmed by heat generated at the solar heat collector sheet 3. Such warmed air rises in natural convection currents 16. The upward movement of the air is enhanced by a partial vacuum in ductwork 19 produced by blower 9. Fresh warm air from outside of the heat collector transparency may enter the stream of ascending air through openings 4'. If openings 4' are designed as in FIG. 2 for example, ascending air currents 16 whisk past the openings and tend to create a venturi effect, thereby aiding the introduction of fresh warm air at 18 into the stream of ascending air.

As illustrated in FIG. 3, if the point of storage 28 or use 30 of the warmed air is at an elevation higher than the solar heat collector, it is possible to use the system without a power blower. Ascending air currents 26 transfer the heat from inside of the collector to storage 28 and out of the building at 29 and also induce fresh warm air entry through openings 4' as illustrated at 27.

As a practical approach, if a power blower is to be used to produce a slight vacuum inside of the solar collector, the transparency seals may be constructed for slight air leakage therethrough into the collector. However, even here, introduction of warm air from outside will be enhanced if the openings are constructed to utilize a jet-venturi effect, or in other ways whereby the ascending convection currents 16 draw the fresh warm air in from the outside. A "shingling" of panes of glass, with a slit 4' therebetween as at 25 in FIG. 2, is one practical way of achieving the desired result.

Movement of the warm air outside of the collector glazing tends to be upwardly and, at times, this upward movement is accelerated by a breeze or wind blowing onto the glazing and being deflected upward along the sloping surface. These factors enhance flow of the warm air in through openings 4'.

Although only one transparent collector cover is illustrated it is to be understood that two or more transparencies could be provided. The warm air between transparencies would preferably be allowed to ascend, as convection currents, and then pass on to storage or a point of use. Warm air from the outside would be permitted to enter through slits or other openings in the outer transparency in a manner similar to that described for one transparency.

For some purposes constant circulation of air through the system and interior 30 of the building is desirable, e.g. lumber or crop drying. In other instances it is desirable to bypass the interior 30 and circulate air from the top of solar collector 1 to heat storage apparatus 5 and directly back to the solar collector. As exemplary of such operation the interior 30 may be warm enough but additional heat is to be stored for later use. In such instance damper 31 may be opened, or partially opened, and damper 32 may be closed, or partially closed, to reduce or temporarily eliminate circulation through interior 30. Thus the air is returned from the storage apparatus directly to the solar heat collector through opening 33.

Some of the solar energy entering through transparency 2 and warming collector sheet 3 warms the air therebetween which rises at 16. Some of the heat warms air between sheets 3 and 4 and this warmed air rises at 17. Some of the heat warms sheet 4 and, at least to a limited extent, the heat gets through sheet 4, even if it is insulating in nature. This, in turn, warms air inside the building. This heated air rises as illustrated at 20.

Warm sheet 4 also radiates some infrared heat to the interior of the building. The amount of heat so radiated may be minimized, if desired, by a high degree of heat insulating reflectivity of sheet 4, or by glass fiber, foam or other insulation, or by both reflective and fiber or foam insulation. Or, the amount of heat radiated may be increased by reducing the insulating value of the material or by completely eliminating sheet 4 and all insulating materials.

Damper 21 may be moved to any desired position to allow air to flow only from space 30, through opening 34, to duct 19, or from space 30 plus the space between sheets 3 and 4, or from these spaces plus the space between transparency 2 and sheet 3.

I claim:

1. Solar heating apparatus comprising a solar heat collector having an upper edge and a lower edge, an inlet adjacent to the lower edge for air to be heated and an outlet adjacent to the upper edge for heated air discharge, heat storage means, conduit means for circulation of air serially through said solar heat collector and through said heat storage means, passage means leading from an area immediately outside the solar heat collector, and spaced upwardly from the lower edge and said inlet, to introduce fresh partially warmed air into said solar heat collector, and vent means to expel stale air from said apparatus.

2. Apparatus as in claim 1 and walls enclosing a space to be heated or ventilated or both, and conduit means for circulation of air from said heat storage means to said space and to said solar heat collector.

3. Apparatus as in claim 1 and means to bypass circulation of at least a portion of the air directly from said heat storage means to said solar heat collector.

4. Apparatus as in claim 1 and power operated means to circulate air through said solar heat collector and said heat storage means.

5. Apparatus as in claim 1 wherein said passage means to introduce fresh air into said solar heat collector comprises passage means leading from a location adjacent to an outer surface of said heat collector whereby the fresh air being introduced is pre-warmed prior to and as it enters the solar heat collector.

6. Apparatus as in claim 2 wherein said vent means to expel stale air comprises conduit means leading from said space to the exterior of said space.

7. Apparatus as in claim 6 and damper means in said vent means to control the rate of stale air expulsion.

8. Apparatus as in claim 1 wherein said heat storage means comprises a layer of masonry blocks providing air passageways therethrough and air passages therefrom, heat storage material above said layer of masonry blocks and through which air passes in heat-exchange relationship with said heat storage material, and a passageway leading outwardly from said heat storage means.

9. Apparatus as in claim 1 wherein said solar heat collector comprises an outer transparency, solar energy absorbing material below said transparency, and a passageway for circulation of air to remove heat trapped under said transparency, said passage means extending from a location immediately outside of said transparency to said passageway to admit air to said collector.

10. Apparatus as in claim 9 wherein said solar energy absorbing material comprises an outer sheet with an outer energy absorbing surface, and an inner sheet having a reflective surface.

11. Apparatus as in claim 10 wherein air is circulated between said outer sheet and said inner sheet.

12. A solar heat collector having an upper edge and a lower edge, an inlet adjacent to the lower edge for introduction of air to be heated and an outlet adjacent to the upper edge for heated air discharge, an outer transparency, solar energy absorbing material below said transparency, a passageway for circulation of air to remove heat trapped under said transparency, and passage means leading from a location immediately outside of said transparency and spaced upwardly from the lower edge and said inlet to introduce to said passageway fresh pre-warmed air rising from said collector.

13. Apparatus as in claim 12 wherein said solar energy absorbing material comprises an outer sheet with an outer energy absorbing surface, and an inner sheet having a reflective surface.

14. Apparatus as in claim 13 wherein air is circulated between said outer sheet and said inner sheet.

15. Solar heating apparatus comprising a building structure, a solar heat collector, having a lower edge and an upper edge, mounted in an inclined position on said building and facing in a direction to intercept solar insolation, said solar heat collector comprising an inlet adjacent to the lower edge for introduction of air to be warmed and an outlet adjacent to the upper edge for warmed air discharge, a transparent outer covering with solar heat collecting means therebeneath, air in said solar heat collector being in contact with said heat collecting means to thereby warm said air whereby said warmed air ascends through said inclined solar heat collector, heat storage means, means to circulate the warmed air from the outlet from said solar heat collector to said heat storage means for storing a portion of the heat from the warmed air and to circulate the air to the interior of the building structure and back to the inlet to said solar heat collector, the air, while passing through the building structure, warming and driving off liquids or vapors from the interior or contents of the building structure in the form of vapor in the air, means to remove a portion of the vapor and air from the building structure, and means to introduce fresh makeup air to the system from an area immediately above the transparent covering and spaced upwardly from the lower edge of the heat collector to replace the removed air.

16. Apparatus as in claim 15 wherein said solar heat collector comprises a first sheet of material having an upper heat-receiving surface, a heat reflective sheet below said first sheet with an air space therebetween, air circulating between said sheets to remove a portion of the heat from said first sheet with a portion of the heat warming said second sheet, said second sheet radiating heat to the interior of said building structure to help warm the interior, or contents, to help drive off liquids or vapors therefrom into the circulating air.

17. Apparatus as in claim 15 wherein said solar heat collecting means comprises a sheet of material having an upper heat-receiving surface and a lower heat radiating surface to radiate heat to the interior of the building structure to help warm the interior.

18. Solar heating apparatus comprising a solar heat collector, heat storage means, conduit means for circulation of air through said solar heat collector and said heat storage means, passage means to introduce fresh air into said solar heat collector, vent means to expel stale air from said apparatus, said heat storage means comprising a layer of masonry blocks providing air passageways therethrough and air passages therefrom, heat storage material above said layer of masonry blocks and through which air passes in heat-exchange relationship with said heat storage material, a passageway leading outwardly from said heat storage means, said heat storage material comprising stone-like material, a top for said heat storage means comprising a concrete-like material, and insulation means between said stone-like and said concrete-like materials.

19. Apparatus as in claim 18 wherein said heat storage material comprises stone-like material, and a top for said heat storage means comprising a concrete-like material, said concrete-like material being in heat-exchange relationship with said stone-like material such that the concrete-like material serves as additional heat storage material.

20. Apparatus as in claim 19 wherein said concrete-like material comprises a floor for space to be heated above said heat storage material.

References Cited

UNITED STATES PATENTS

| | | | |
|---|---|---|---|
| 246,626 | 9/1881 | Morse | 126—270 |
| 430,762 | 6/1890 | Taylor | 126—270 X |
| 2,484,127 | 10/1949 | Stelzer. | |
| 2,529,621 | 11/1950 | Mayo | 237—1 |
| 2,680,565 | 6/1954 | Lof | 237—1 |

FOREIGN PATENTS 1,204,560    8/1959    France.

CHARLES J. MYHRE, *Primary Examiner.*